United States Patent
Subbareddyar et al.

(10) Patent No.: US 9,316,152 B2
(45) Date of Patent: Apr. 19, 2016

(54) ACTIVE CONTROL OF BUCKET COOLING SUPPLY FOR TURBINE

(75) Inventors: Thangaraj Subbareddyar, Bangalore (IN); Mayur Abhay Keny, Bangalore (IN); Mahendhra Muthuramalingam, Bangalore (IN)

(73) Assignee: General Electric Company, Schenectady, NY (US)

(*) Notice: Subject to any disclaimer, the term of this patent is extended or adjusted under 35 U.S.C. 154(b) by 981 days.

(21) Appl. No.: 13/495,306

(22) Filed: Jun. 13, 2012

(65) Prior Publication Data

US 2013/0336757 A1 Dec. 19, 2013

(51) Int. Cl.
 *F02C 7/18* (2006.01)
 *F01D 25/12* (2006.01)
 *F01D 5/08* (2006.01)

(52) U.S. Cl.
 CPC . *F02C 7/18* (2013.01); *F01D 25/12* (2013.01); *F01D 5/081* (2013.01)

(58) Field of Classification Search
 CPC ............ F02C 7/18; F02C 7/125; F02C 6/08; F02C 6/04; F02C 6/06; F01D 25/12; F01D 17/14; F01D 5/081; F05D 2300/505; F05D 2300/50212
 See application file for complete search history.

(56) References Cited

U.S. PATENT DOCUMENTS

| | | | | |
|---|---|---|---|---|
| 4,296,599 A * | 10/1981 | Adamson | ............... | F02C 7/18 415/115 |
| 5,022,817 A * | 6/1991 | O'Halloran | ............... | F01D 5/18 415/115 |
| 6,351,937 B1 * | 3/2002 | Matsuda | ............... | F01D 5/082 415/216.1 |
| 6,485,255 B1 * | 11/2002 | Care | ............... | F01D 5/187 415/12 |
| 7,445,424 B1 * | 11/2008 | Ebert | ............... | F01D 5/081 415/113 |
| 7,462,976 B2 | 12/2008 | Semmere et al. | | |
| 8,434,692 B2 * | 5/2013 | Scott | ............... | F23R 3/06 137/467 |
| 8,549,864 B2 * | 10/2013 | Langdon, II | ............... | F01D 17/085 251/11 |
| 8,561,386 B2 * | 10/2013 | Mons | ............... | F01D 25/12 60/266 |
| 8,684,660 B2 * | 4/2014 | Miranda | ............... | F01D 5/082 415/115 |
| 8,833,053 B2 * | 9/2014 | Chir | ............... | F02C 6/08 60/39.5 |
| 9,062,605 B2 * | 6/2015 | Roussely-Rousseau | | F01D 5/081 |
| 2002/0125340 A1 * | 9/2002 | Birch | ............... | F02K 1/383 239/265.11 |
| 2010/0089468 A1 * | 4/2010 | Scott | ............... | F23R 3/06 137/468 |
| 2010/0303616 A1 * | 12/2010 | Chir | ............... | F02C 6/08 415/178 |
| 2011/0030337 A1 * | 2/2011 | Mons | ............... | F01D 25/12 60/226.1 |
| 2012/0151936 A1 * | 6/2012 | Roussely-Rousseau | | F01D 5/081 60/785 |

* cited by examiner

*Primary Examiner* — Nathaniel Wiehe
*Assistant Examiner* — Eldon Brockman
(74) *Attorney, Agent, or Firm* — Ernest G. Cusick; Hoffman Warnick LLC (57) ABSTRACT

A cooling gas flow control device for a turbine rotor that is internally located between the compressor and the turbine section of a turbine is disclosed. The cooling gas flow control device has a shape memory material that is used to actively adjust the cooling gas flow to internal parts of the turbine section between, including the buckets.

15 Claims, 8 Drawing Sheets

ACTIVE CONTROL OF BUCKET COOLING SUPPLY FOR TURBINE

FIELD OF THE INVENTION

The invention generally relates to an apparatus and method for cooling a turbine.

BACKGROUND OF THE INVENTION

A gas turbine engine conventionally includes a compressor for compressing ambient air to be mixed with fuel and ignited to generate hot combustion gases in a combustor. The turbine receives hot combustion gases from the combustor and extracts energy therefrom for powering the compressor and producing output power, for example for powering an electrical generator. The turbine conventionally includes one or more stages of stator nozzles or vanes, buckets or turbine blades, and annular shrouds around the turbine blades for maintaining appropriate clearances therewith. As the turbine inlet temperatures have increased to improve the efficiency of gas turbine engines, it has become necessary to provide a cooling fluid, such as air, to the turbine vanes, buckets and shrouds to maintain the temperatures of those components at levels that can be withstood by the materials thereof, to ensure a satisfactory useful life of the components. Cooling of the turbine is typically accomplished by extracting a portion of the air compressed by the compressor from the compressor and conducting the portion of the compressed air to the internal portions of the turbine, including the turbine vanes, buckets and shrouds to cool the same. Any air compressed in the compressor and not used in generating combustion gases necessarily reduces the efficiency of the turbine. Therefore, it is advantageous to minimize the amount of cooling air bled from the compressor.

Turbines are typically designed to operate at full load. However, with alternative methods of generating energy, such as wind turbines, becoming more popular, it has become important that gas turbines be able to operate efficiently at part-load conditions, to generate enough power needed to supplement the alternative methods of generating energy. In addition, when alternative methods of generating energy are not available, a turbine must be available to generate power to make up for the lost alternative method of generating energy. Similarly, days when the conditions are off design for the turbine, for example, hot days, the turbine may not be able to operate at full load. On these days it may become necessary to operate the turbine under a part load condition to keep the turbine operating within its design operating parameters.

Generally, the cooling circuits in turbines are optimized for full load operations. As a result, in part load operations the cooling circuit generally provides more cooling than necessary.

SUMMARY OF THE INVENTION

Generally stated, the present invention provides a cooling gas flow control device for a turbine rotor. The cooling gas flow control device has an internal cooling gas pathway located between an outlet of a compressor section and an inlet for an internal turbine cavity of a turbine section; and an adjustable gas flow valve located between the outlet of the compressor and the inlet for the rotor cavity in the cooling gas pathway, wherein the adjustable gas flow valve adjusts gas flow through the cooling gas pathway based on a physical parameter of compressed gas exiting a compressor of the turbine.

In addition, the present invention also provides a method of controlling cooling gas for an internal cavity of the turbine section to cool the buckets and other component of the turbine section of the turbine. The method includes the steps of a) drawing cooling gas from a compressor section of a turbine, said cooling gas having a temperature; b) directing the cooling gas into an internal pathway connecting the compressor section and the internal cavity of the turbine section of a turbine, and c) passing the cooling gas in the internal pathway through an adjustable gas flow valve, the adjustable gas flow device comprises a shape memory material, wherein the shape memory material changes shape based on an input temperature to the shape memory material to adjust the flow of the cooling gas through the internal pathway to the cavity of the turbine rotor.

By providing cooling gas flow control device, the efficiency of the turbine containing the gas flow control device can be improved when the turbine is operated under part load conditions and off design operating conditions.

DETAILED DESCRIPTION OF THE INVENTION

To gain a better understanding of the invention, attention is directed to the Figures of the present specification.

Figure 1:
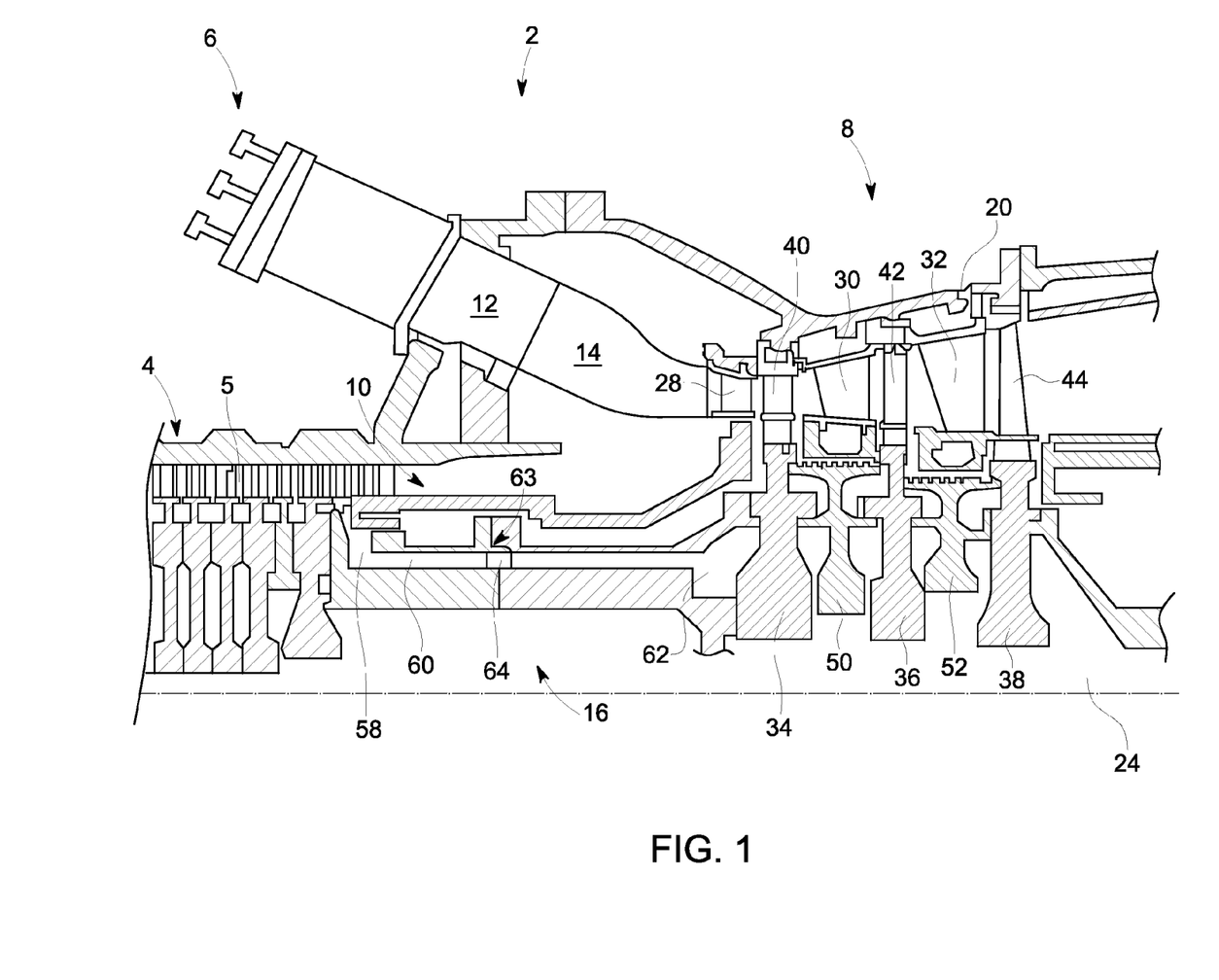
FIG. 1 schematically depicts a turbine including an internal cooling gas pathway.

Referring to FIG. 1, shown is an exemplary turbine 2, which has a compressor section 4, a combustor section 6 and a turbine section 8. Compressor section 4 has an inlet (not shown) which intakes the gas to be compressed. Compressor section 4 may be an axial compressor having alternating rows of stator vanes and buckets arranged in a plurality of stages for sequentially compressing the gas, generally air, with each succeeding downstream stage, thereby increasing the pressure higher and higher until the compressed gas is discharged from a compressor outlet 10 at maximum pressure.

Combustor section 6 receives the compressed gas from compressor section 4 via compressor outlet 10. Conventional fuel supply conduits and injectors (not shown) are further provided for providing a suitable fuel, such as natural gas, which is mixed with compressed gas in a fuel-mixing region 12. The combined fuel and compressed gas are transferred to a combustor 14 where the fuel-compressed gas mixture is ignited to generate hot combustion gases.

Disposed downstream from combustor section 6 is turbine section 8. In turbine section 8 the energy of the hot combustion gases is converted into work by turbine section 8. The hot gases are expanded and a portion of the thermal energy is converted into kinetic energy in a nozzle section of turbine section 8. The nozzle section includes a plurality of stator blades, or nozzles, 28, 30, 32. For example, a first stage nozzle includes stator blade 28, a second stage nozzle includes stator blade 30, and a third stage comprises stator blade 32.

Turbine section 8 also includes a bucket section. In the bucket section, a portion of the kinetic energy is transferred to buckets 40, 42, 44, also known as "turbine blades", which are connected to rotor wheels 34, 36, 38, respectively, and the kinetic energy is converted to work. Wheel 34 and bucket 40 form the first stage, wheel 36 and bucket 42 for the second stage, and wheel 38 and bucket 44 form the third stage. Spacers 50, 52 may be provided between each pair of rotor wheels. Additional stages may be present in turbine section 8, where each addition stage contains a stator blade and a bucket. During operation, the buckets extract energy from the combustion gases, which in turn rotates rotor wheels 34, 36, 38. Each rotor wheel is connected to a rotor shaft (not shown) and the rotor shaft is connected to the compressor section which to turn rotor blades 5 of compressor section 4. As described above, the turbine section has three buckets. It is noted that the number of bucket stages can be greater than three. Generally for each additional bucket stage, there will be a corresponding rotor wheel and stator blade.

The combustion gases that act on the buckets to create energy or work from the turbine also cause the buckets to heat. The buckets generally have a relativity small clearance in between an annular stator shroud 20 and the tips of each individual bucket. As a result, the temperature of the buckets must be controlled within operating parameters to maintain efficiency of the turbine and to prevent the buckets from expanding and becoming damaged by contacting stator shroud 20 during operation. Additionally, when the external gas temperature is significantly high, the combustion gases are heated even higher, thereby causing the buckets to heat to a higher temperature, which could result in melting of the buckets. Therefore, it is necessary to cool the buckets to prevent expansion and potential melting of the buckets during normal operations.

To provide for cooling of buckets 40, 42, 44 and other components of turbine section 8, a portion of the compressed gas is bled from compressor section 4 of the turbine. Buckets 40, 42 and 44 have internal channels or passages (not shown) that allow the cooling gas to pass there through, effectively cooling the buckets. Similarly, the stators may also include internal channels or passages (not shown) to provide for cooling thereof. Once the cooling gas passes through the internal channels or passages, the cooling gas may be vented to be mixed with the exhaust gases of the turbine, recirculated to the compressor, or vented in any other effective manner.

Figure 2:
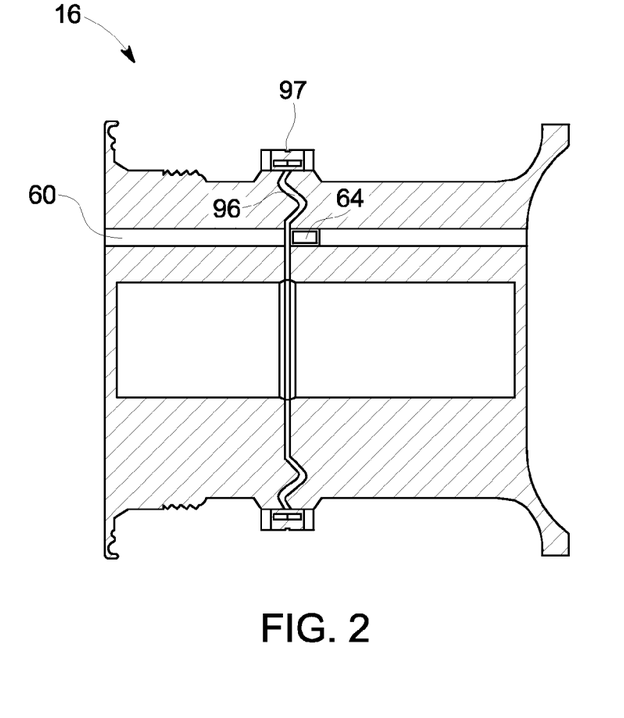
FIG. 2 depicts a partial interior perspective view the connecting wheel of the turbine.

Cooling gas is internally transported from compressor section 4 to the internal cavity of turbine section 8, via an internal cooling gas pathway 60. Internal cooling pathway 60 is located between bled gas outlet 58 of compressor section 8, and an inlet 62 for internal turbine rotor cavity 24 of turbine section 8. Inlet 62 will be in fluid communication with internal channels and passages of buckets 40, 42, 44 and the other components of turbine section 8. Internal cooling gas pathway 60 will generally be located in a connecting wheel 16. Connecting wheel 16 rotates during operation of turbine 2. Generally, internal cooling pathway 60 may be a conduit located within connecting wheel 16. Internal cooling pathway 60 may be a single pathway or could be a plurality of pathways, as is shown in FIG. 2. FIG. 2 shows a portion of connecting wheel 16 where it can be seen that there are multiple internal cooling pathways 60.

During off design operation of the turbine, the amount of cooling gas needed to cool the buckets and other parts of turbine section 8 changes. For example, during part-load operation, the amount of cooling gas needed to cool the buckets will drop, since less than a full design load of combustion gases will contact the buckets. As a result, there is a need to control the volume of cooling gas that is internally circulated to the buckets. It has been discovered that the volume of the cooling gas flowing to internal cavity 24 of turbine section 8 to cool the components of the turbine section can be controlled by using a cooling gas flow control device 63 that includes the internal cooling gas pathway 60 with an adjustable gas flow valve 64 located in the internal cooling gas pathway 60. Adjustable gas flow valve 64 adjusts the gas flow through the pathway based on a physical parameter of the compressed gas exiting compressor section 4 of turbine 2. The physical parameter measured could be, for example, pressure or temperature and may be measured based on the cooling gas being bled from the compressor section 4 or may be measured based on the physical parameter of the compressed gas exiting compressor section 4 entering fuel mixing region 12 of combustor section 6.

To adjust the cooling gas flow to internal cavity 24, adjustable gas flow value 64 may contain a shape memory material. Shape memory materials are materials that have a first shape at a given temperature and a second shape at a second temperature, generally called the transition temperature. Generally, the second temperature, or transition temperature, is higher than the given temperature. At any temperature below the transition temperature, the shape memory material will have and retain the first shape. At or above the transition temperature, the shape memory material will have and will retain the second shape. Examples of material that are shape memory materials include metal alloys and polymers. Generally, for high temperature applications, metal alloys are used in turbine applications due to the high temperatures. Additionally, the materials exhibiting shape memory effect may be coated with a thermal barrier coating to reduce the effects of the cooling gas on the shape memory materials.

Several reported metal alloys that experience a temperature related solid state micro-structural phase change that enables an article made from such alloy to change from one physical shape to at least another physical shape sometimes are referred to as shape memory alloys (SMA). A widely known and reported SMA is a titanium nickel alloy frequently called Nitinol alloy. Other suitable metals that may be used to form the shape memory alloy include, for example, but are not limited to manganese, iron, aluminum, silicon, copper, zinc, silver, cadmium, indium, tin, lead, thallium, platinum, ruthenium, tantalum, and niobium.

In the manufacture of an article from such an alloy intended to change from one shape to at least one other shape during use, the article is provided in a second shape intended for operating use at or above the transition temperature. Such second shape is developed by working and annealing an article preform of the alloy at or above the transition or critical temperature at which the solid-state micro-structural phase change occurs. However, below that critical temperature, such an alloy is malleable and the article of the second shape can be deformed into a desired first shape, for example for inclusion at substantially room temperature in an assembly. Thereafter, for example in service operation of the article, when the SMA article in the first shape is heated at or above its critical temperature, it undergoes a micro-structural phase change that results in it returning to the second shape. Likewise, when the temperature goes below the transition temperature, the SMA material returns to its first shape.

Figure 3:
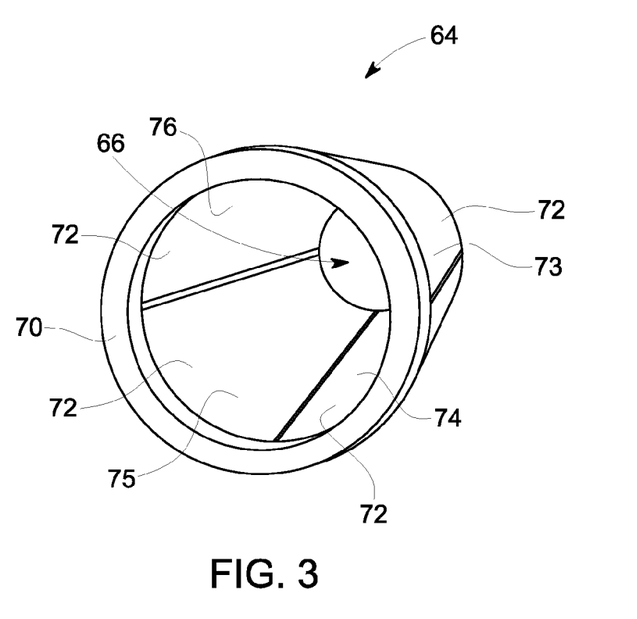
FIG. 3 depicts an exemplary adjustable cooling gas flow valve.
Figure 4:
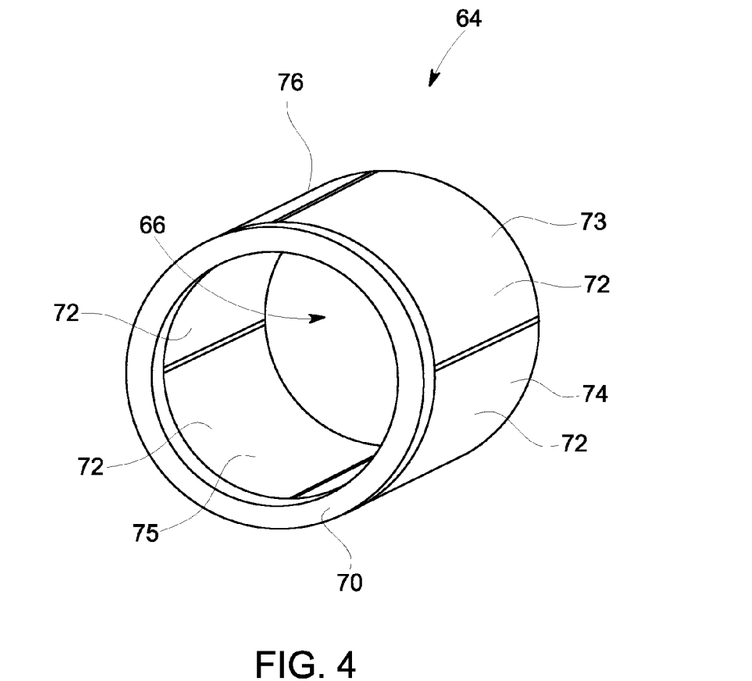
FIG. 4 depicts an exemplary adjustable cooling gas flow valve.

Referring to FIG. 3 and FIG. 4, depicted is an adjustable gas flow valve 64 having a mount 70 and a shape memory material 72 having a first shape, shown in FIG. 3, and a second shape, shown in FIG. 4. During normal operations, adjustable gas flow valve 64 will have the second shape shown in FIG. 4 to allow maximum gas flow through adjustable gas flow valve 64. Shape memory material 72 is shown in FIG. 3 in its first shape, which is the shape of the shape memory material during part load operations or other similar conditions, when the turbine operates at a lower temperature and a slower speed. The first shape reduces the flow of the cooling gas through adjustable gas flow valve 64, by reducing the size of an exit orifice 66 in which the compressed cooling gas has to pass through. When operated at part load conditions, the compressed cooling gas exiting compressor section 4 of the turbine will typically have a lower temperature and a lower pressure. Likewise the compressed gas leaving compressor section 4 and being fed to combustor section 6, will also have a lower temperature. In addition, the combustion gases generated to create the kinetic energy will be reduced causing a lower gas temperature in turbine, thereby reducing the need for internal cooling of buckets 40, 42, 44 in the turbine. As shown in FIG. 3 and FIG. 4, the shape of shape memory material 72 changes based on the temperature of the cooling gas flowing through adjustable gas flow valve 64. However, shape memory material may be modified to receive a sampling of the compressed gas leaving compressor section 4, in a similar manner described below. Generally, shape memory material 72 will have a shape shown in FIG. 3 until the cooling gas reaches the transition temperature of shape memory material 72, then shape memory material 72 changes shape to the shape shown in FIG. 4, to allow more cooling gas to internally flow to buckets 40, 42, 44. When the physical parameters of the cooling gas changes or the compressed gas leaving compressor section 4 changes, as the result of a part load operation or other similar conditions, shape memory material 72 changes its shape, from the shape shown in FIG. 4 to the shape shown in FIG. 3 to reduce the flow of the cooling gas to the internal cavity of turbine section 8 to internally cool the buckets and other parts of turbine section 8. Likewise, in response to the physical parameter of the compressed gas changing as a result of operation under normal operating parameters from part-load operations, shape memory material 72 changes to the shape shown in FIG. 4 to increase the flow of the cooling gas to the internal portion of the rotor cavity. As shown in FIGS. 3 and 4, shape memory material 72 changes between a truncated conical shaped (FIG. 3) to a cylindrical shape (FIG. 4).

As is shown in FIG. 3 and FIG. 4, the shape memory material is divided into for sections, 73, 74, 75 and 76. Each section of the shape memory material may have the same or different transition temperature. One advantage to having each section with a separate transition temperature is that each section may change its shape at different temperature, thereby providing a gradual change to the flow of the cooling gas to the internal portion of the rotor cavity. This will allow the adjustable gas flow valve to change the flow depending on the current operating conditions of the turbine, thereby providing better control of the cooling gas being delivered to the internal components of the turbine section.

Figure 5:
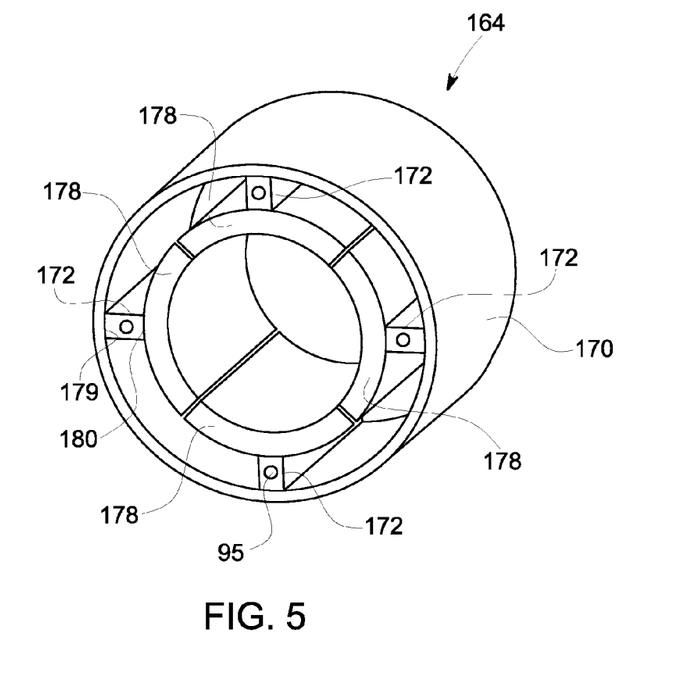
FIG. 5 depicts another exemplary adjustable cooling gas flow valve.
Figure 6:
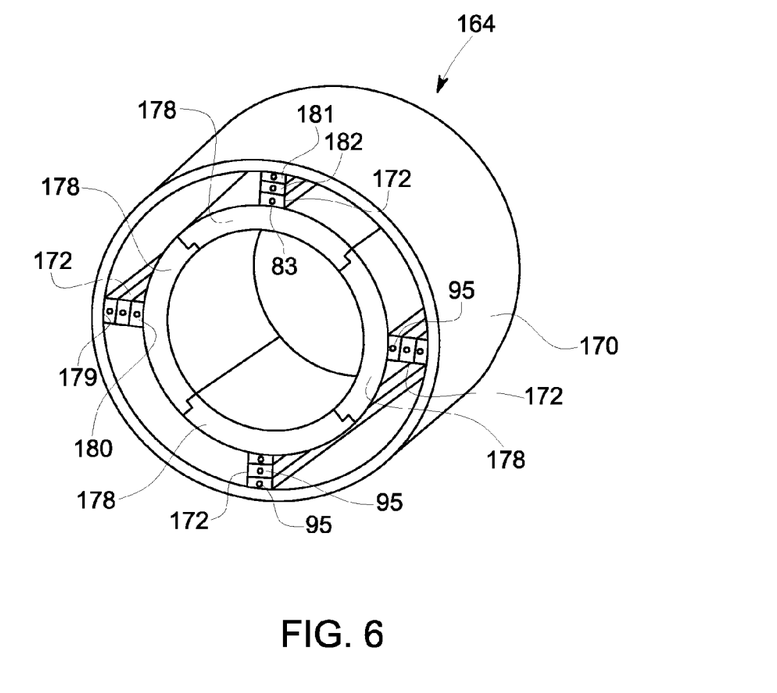
FIG. 6 depicts a variation of the adjustable cooling gas flow value shown in FIG. 5 having multiple shape memory materials.
Figure 7:
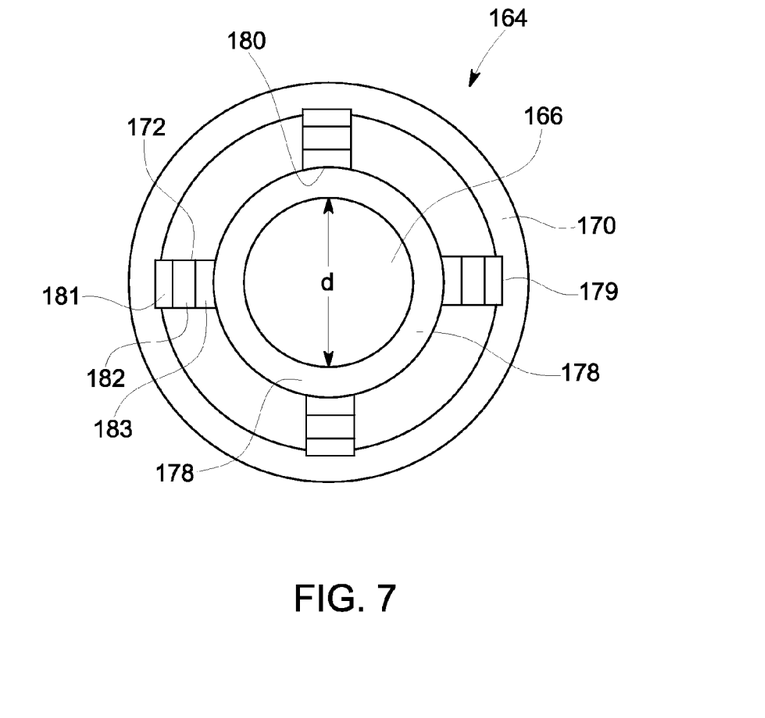
FIG. 7 shows a cross-section of the adjustable cooling gas flow valve of FIG. 6 under part load operating conditions.
Figure 8:
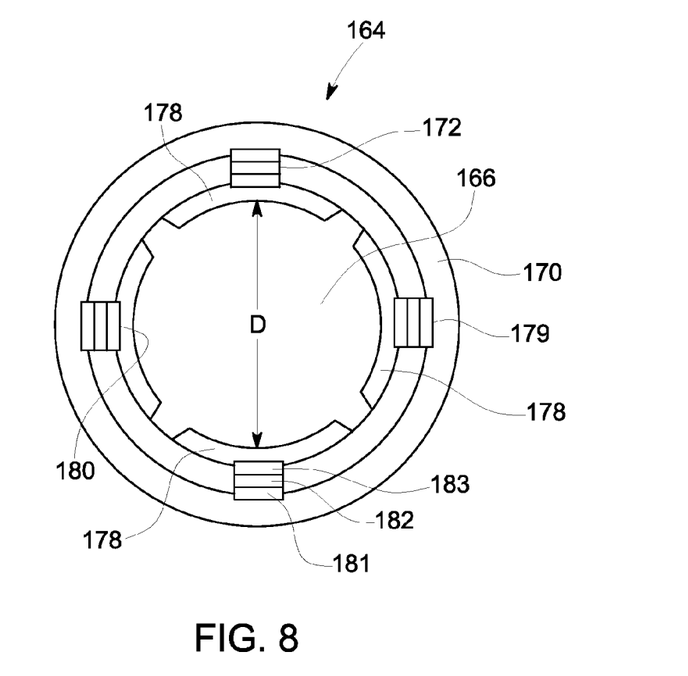
FIG. 8 shows a cross-section of the adjustable cooling gas flow valve of FIG. 6. under normal operating conditions.

In a different configuration, shown in FIG. 5, the cooling gas flow control device 164 may have an adjustable gas flow valve with a mount 170, a shape memory material 172 connected to mount 170 and a flow restrictor 178. Each shape memory material 172 has a first end 179 connected to mount 170 and a second end 180 connected to flow restrictor 178. As shown, there are multiple shape memory materials 172 and multiple flow restrictors. Flow restrictors 178 are moved into the cooling gas pathway to reduce the flow of the cooling gas through adjustable gas flow valve 164 during operations of the turbine which require less cooling gas to cool internal components of the turbine cavity and are retracted from the cooling gas pathway during times in which more internal cooling gas is needed to cool the internal components of the turbine cavity. To gain a better understanding of this, attention is directed to FIG. 7 and FIG. 8. In FIG. 7, the configuration of adjustable gas flow valve 164 under part load operating conditions is shown. As can be seen, the diameter d of the orifice 166 in the cooling gas flow control device is created by flow restrictors 178 coming together to form the inner diameter d of adjustable gas flow valve 164 as shape memory material 172 is in its first shape. In FIG. 6, the configuration of adjustable gas flow valve 164 under normal operating conditions is shown. As can be seen, the diameter D of the orifice in cooling gas flow control device 164 is created by flow restrictors 178 being held in a position such that flow restrictors 178 are not in contact with one another. Flow restrictors 178 are held in this position by shape memory material 172 in its second shape. As can be easily seen, diameter D is greater than diameter d, thereby in the configuration shown in FIG. 8, more cooling gas flows through adjustable gas flow valve 164 than in the configuration shown in FIG. 7.

Referring to FIG. 6, adjustable gas flow valve 164 has a similar structure to that shown in FIG. 5 except that shape memory material 172 is constructed with multiple shape memory materials 181, 182 and 183. Although shown with three different shape memory materials, there could be more than three different shape memory materials, for example four, five or six or more shape memory materials may be used. In addition, as few as two different shape memory materials could be used. When multiple shape memory materials are used, each shape memory material will generally have a different transition temperature. By having different transition temperatures, as the operating conditions of the turbine changes, each individual shape memory material will be able to change its shape independently of the other shape memory materials, providing a better control of the cooling gas to the internal portion of the rotor section depending on the operating conditions of the turbine.

Figure 9:
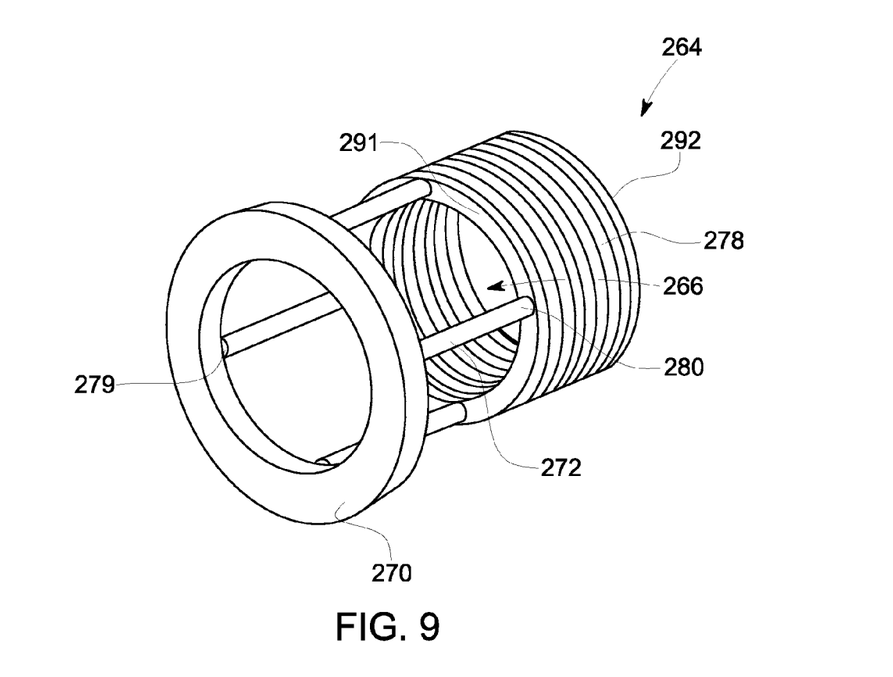
FIG. 9 depicts another exemplary adjustable cooling gas flow valve with an adjustable flow restrictor.
Figure 11:
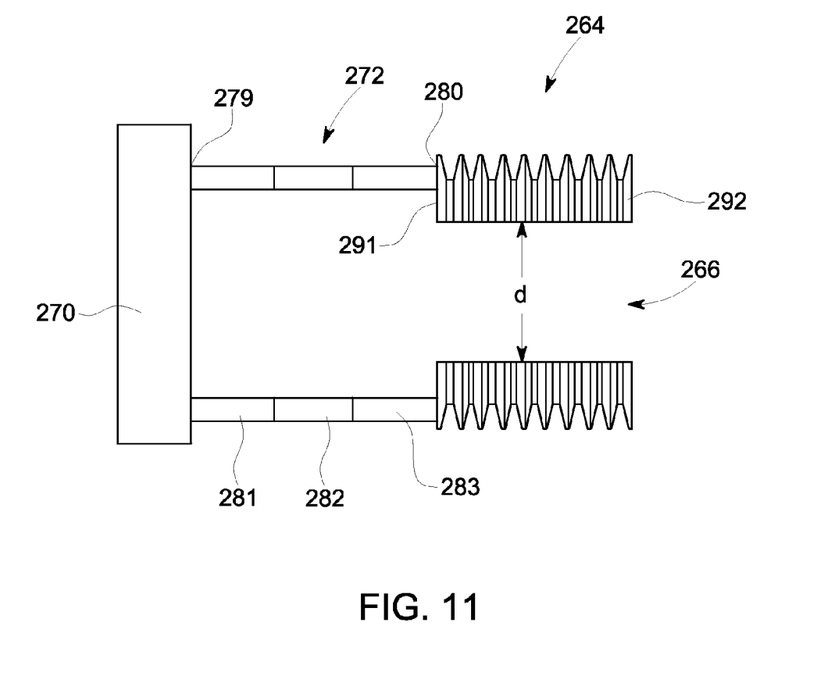
FIG. 11 shows a cross-section of the adjustable cooling gas flow valve of FIG. 10 under part load operating conditions.
Figure 12:
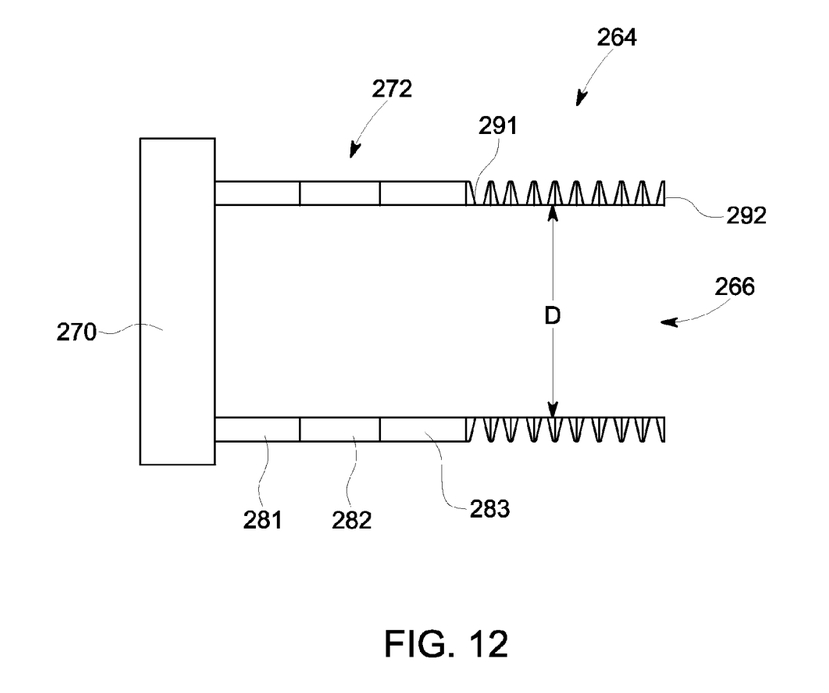
FIG. 12 shows a cross-section of the adjustable cooling gas flow valve of FIG. 10 under normal operating conditions.

In a further configuration shown in FIG. 9, adjustable gas flow valve 264 has a mount 270, a shape memory material 272 connected to the mount 270 and a flow restrictor 278. Each shape memory material 272 has a first end 279 connected to the mount 270 and a second end 280 connected to a unitary flow restrictor 278. As shown in FIG. 9, flow restrictor 278 has bellows-like or accordion-like structure. Flow restrictor 278 has a first end 291 that is connected to the second end 280 of shape memory material 272, and a second end 292, which will be typically connected to or held in place in internal cooling pathway 60 of the connecting wheel 16 (FIG. 2). As shape memory material 272 cools below the transition temperature, shape memory material 272 expands, causing flow restrictor 278 to become compressed such that first end 291 of flow restrictor 278 becomes closer to second end 292 of the flow restrictor 278. Conversely, when shape memory material 272 is heated above the transition temperature of shape memory material 272, shape memory material 272 contracts, thereby causing the flow restrictor to be expanded. When compressed, flow restrictor 278 reduces the diameter of orifice 266 that the cooling gas flows through to reduce the flow of the cooling gas through adjustable gas flow valve 264 during operations of the turbine under conditions that require less cooling gas to cool internally components of the rotor cavity. When expanded, the diameter of the orifice increases thereby increasing the cooling gas flow through adjustable gas flow valve 264 during operations of the turbine which require more cooling gas to cool internal components of the rotor cavity. To gain a better understanding of this, attention is directed to FIG. 11 and FIG. 12. In FIG. 11, the configuration of adjustable gas flow valve 264 under part load operating conditions is shown. As can be seen, the diameter d of orifice 266 in adjustable gas flow valve 264 is reduced by the corrugations of the accordion-like structure of flow restrictor 278 coming together to form the inner diameter d of adjustable gas flow valve 264, in response to the shape memory material 272 being in its first shape. In FIG. 12, the configuration of adjustable gas flow valve 264 under normal operating conditions is shown. As can be seen, the diameter D of the orifice 266 in adjustable gas flow valve 264 is larger since flow restrictor 278 is stretched out, thereby increasing the diameter in the accordion-like structure. As can be easily seen, the diameter D is greater than the diameter d, thereby in the configuration shown in FIG. 12, more cooling gas flow through adjustable gas flow valve 264.

Figure 10:
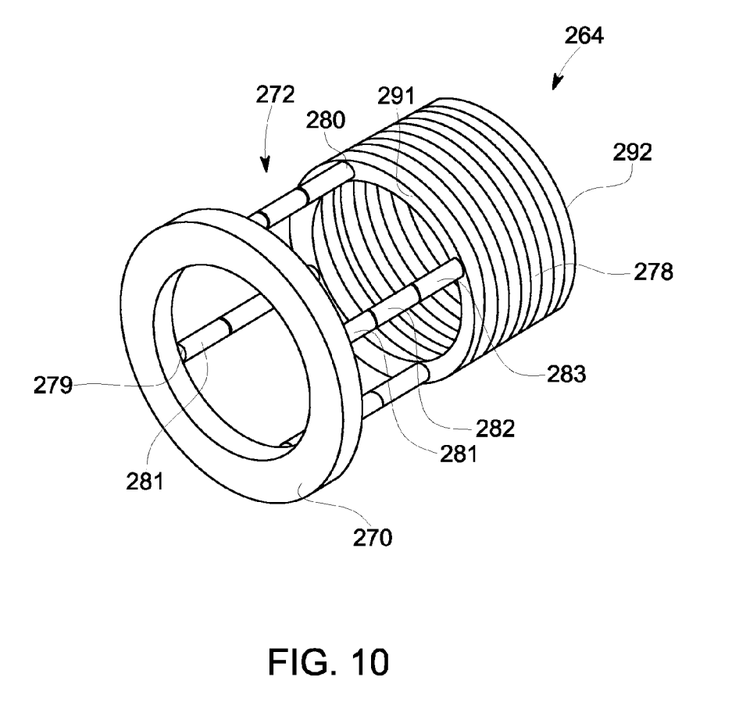
FIG. 10 depicts a variation of the adjustable cooling gas flow value shown in FIG. 9 having multiple shape memory materials.

Referring to FIG. 10, adjustable gas flow valve 264 has a similar structure to that shown in FIG. 9 except that shape memory material 272 is constructed with multiple shape memory materials 281, 282 and 283. Although shown with three different shape memory materials, there could be more than three different shape memory materials, for example four, five, six or more shape memory materials may be used. In addition, two different shape memory materials could be used. When multiple shape memory materials are used, each shape memory material will generally have a different transition temperature. By having different transition temperatures, as the operating conditions of the turbine changes, each individual shape memory material will be able to change its shape independently of the other shape memory materials, providing a better control of the cooling gas to the internal portion of the turbine section 8 depending on the operating conditions of the turbine. In addition, this would provide control over a wide range of operating conditions.

Figure 13:
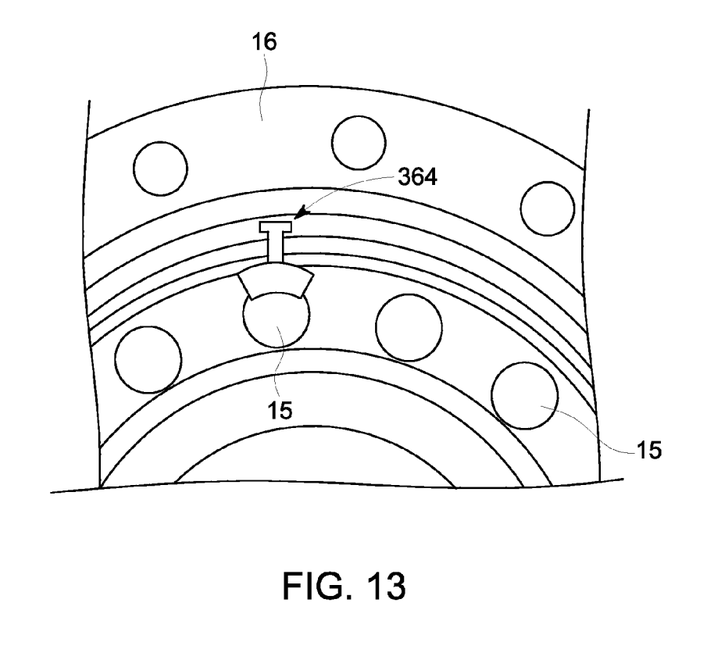
FIG. 13 depicts another exemplary adjustable cooling gas flow valve.
Figure 14:
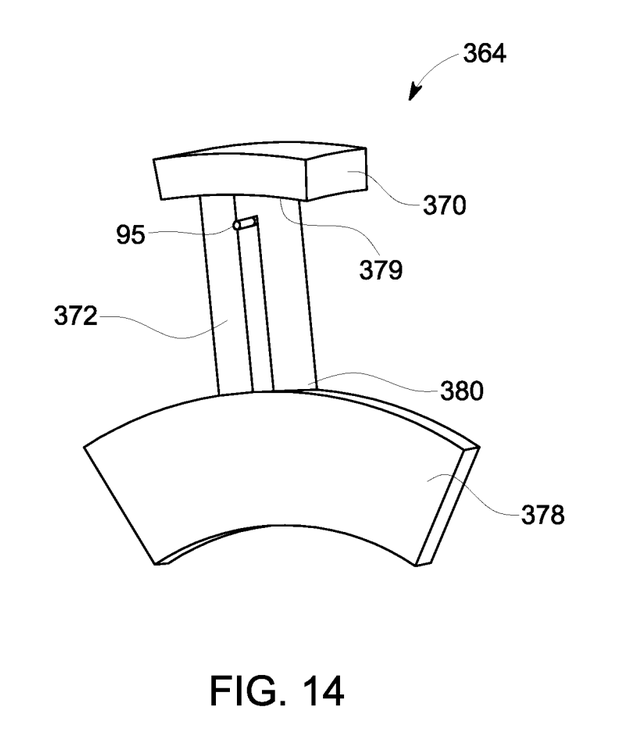
FIG. 14 show a more detailed view of the adjustable cooling gas flow valve shown in FIG. 13

Turning to FIG. 13 and FIG. 14, another adjustable gas flow valve 364 is shown. As shown, adjustable gas flow valve 364 is positioned in an aperture 15 of the connecting wheel 16. Adjustable gas flow valve 364 has a mount 370 that is connected to or is held in place by connecting wheel 16, a shape memory material 372 connected to the mount 370 at a first end 379 of the shape memory material 372. A flow restrictor 378 is connected to a second end 380 of the shape memory material 372. Flow restrictor 378, which is a unitary structure and is in the form of a valve disc is moved into and out of aperture 15 by shape memory material 372. As shape memory material 372 reaches its transition temperature, shape memory material 372 transitions from a size and shape that holds the flow restrictor in aperture 15 to a size and shape which causes the flow restrictor 378 to be withdrawn from aperture 15 and increasing the flow of the cooling gas through the connecting wheel 16. At temperatures below the transition temperature of shape memory material 372 changes size and shape, causing flow restrictor 378 to be moved into the aperture 15, thereby reducing the flow of the cooling gas through the internal pathway 60 of connecting wheel 16.

As with the other shape memory materials of the other described cooling gas flow control devices, the shape memory material shown if FIG. 14 may be constructed with multiple different shape memory materials, each shape memory material having a different transition temperature. By having multiple shape memory materials or segments with different transition temperatures, each individual shape memory material will be able to change its shape independently of the other shape memory materials, providing a better control of the cooling gas to the internal portion of the rotor section depending on the operating conditions of the turbine.

The size and shape of the shape memory materials described above may be adjusted in a variety of way. Typically, the size or shape of the shape memory material is generally adjusted based on a physical parameter of the cooling gas or a physical parameter of the compressed gas exiting the compressor. A physical parameter of the cooling gas or the compressed gas exiting the compressor, such as pressure or temperature may be used to adjust the size or shape of the shape memory materials. It is contemplated, that other parameters of different elements of the turbine could also be used, without departing from the scope and spirit of the present invention.

Generally, if the physical parameter of the cooling gas is used to adjust the size and/or shape of the shape memory materials, the physical parameter will be the temperature of the cooling gas. In such a case, the cooling gas may be used to cool or heat the shape memory material to effect an adjustment to the shape of the shape memory material. For example, the shape memory material may be heated or cooled by the cooling air passing through internal cooling gas pathway 60 between the compressor section 4 and the internal portion of the rotor of turbine section 8 of turbine 2. As the cooling gas increases in temperature, the cooling gas will contact the shape memory material thereby heating the shape memory material to adjust the size and/or shape to allow more of the cooling gas to flow through the cooling gas flow control device.

As is shown in FIG. 5, FIG. 6 and FIG. 14, shape memory material 172, 372 may be provided with one or more channels 95, to allow a gas to pass through shape memory material 172, 372 to help with both heating and cooling of shape memory material 172, 372. Generally, the gas passed through the shape memory material will be a very small portion or sampling of the gas exiting the compressor section 4 of the turbine. This gas is heated to a temperature close to temperature at the compressor discharge. Referring back to FIG. 2, the gas that exits the compressor is allowed to pass through a conduit 96 present in the connecting wheel 16. Gas enters this conduit 96 of connecting wheel 16 via an inlet 97, again shown in FIG. 2. When the gas reaches the end of the conduit 96, the gas enters into channels 95 (FIG. 5, FIG. 6 and FIG. 14) of the shape memory material, thereby heating or cooling shape memory material 172, 372 based on the temperature of the gas exiting turbine compressor 4. This allows shape memory materials 172, 372 to be heated to the temperature of the gas exiting compressor section 4, so that the shape memory material will change shape and/or size to adjust the flow of the cooling gas to the internal portions of the rotor section of the turbine. In the case of multiple shape memory materials, such as is shown in FIG. 6, the gas transported to the shape memory material may be delivered through each of channels 95 found in each of the shape memory materials 181, 182 and 183.

Again, each of these shape memory materials may or will have different transition temperature.

In an alternative configuration, the cooling gas channeled through conduit 60, could also be used to heat or cool the shape memory materials. In this case, the cooling gas may be fed into the channel 95 of the shape memory material so that the shape memory material 172, 372 is heated or cooled based on the temperature of the cooling gas.

Other methods know to those skilled in the art could be used to heat and/or cool the shape memory materials to adjust the cooling gas flow through the connecting wheel. For example, the shape memory material may have a high resistivity element inserted in the shape memory material. The high resistivity element will be connected to a wireless receiver that will pass an electric currently to the high resistivity element, thereby causing the high resistivity element to be heated. The wireless receiver may be wirelessly connected to a wireless transmitter and the wireless transmitter may be connected to a compressed gas parameter-measuring device, which will measure one or more physical parameters of the compressed gas leaving the compressor.

The cooling gas flow device described herein also provides for a method of controlling cooling gas for an internal cavity of the turbine section to cool the buckets and other component of the turbine section of the turbine. The method contains the steps of
  a. drawing cooling gas from a compressor section of a turbine, said cooling gas having a temperature;
  b. directing the cooling gas into an internal pathway connecting the compressor section and the internal cavity of the turbine section of a turbine,
  c. passing the cooling gas in the internal pathway through an adjustable gas flow valve, the adjustable gas flow device comprises a shape memory material, wherein the shape memory material changes shape based on an input temperature to the shape memory material to adjust the flow of the cooling gas through the internal pathway to the cavity of the turbine rotor.

The input temperature could be the temperature of the cooling gas being fed through the internal pathway or the input temperature could be based off the temperature of the compressed gas leaving the compressor section, as is described above. In addition, a small portion of the compressed gas or the cooling gas may be contacted with the shape memory material by allowing the compressed gas or cooling gas to be forced through a channel present in the shape memory material. This will allow the shape memory material to respond to the temperature of the gas being passed through the shape memory materials. Based on the temperature of the gas contacting the shape memory material, it will change its size and/or shape based on whether the temperature of the gas is above or below the transition temperature of the shape memory material.

A turbine having the cooling flow control device described herein exhibits increased efficiency of the turbine under part load operation conditions and other conditions when the turbine is being operated out of specification. By controlling the cooling gas flow to the internal components of the turbine, the blades (buckets) are cooled sufficiently to operate in extremely hot conditions and under high centrifugal fields. One goal in operating a turbine is to maintain a constant temperature in the turbine section components to help reduce thermal cycling. By reducing the cooling gas flow by compressor bleed during part-load or off ambient conditions, the thermal efficiency of the turbine may be increased.

Although the present invention has been described with reference to various embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

The invention claimed is:

1. A cooling gas flow control device for a turbine rotor comprising:
  a. an internal cooling gas pathway located between an outlet of a compressor section and an inlet for an internal turbine cavity of a turbine section; and
  b. an adjustable gas flow valve located between the outlet of the compressor and the inlet for the rotor cavity in the cooling gas pathway, the adjustable gas flow valve including:
    a mount,
    a plurality of shape memory materials each having a first end and a second end, wherein the mount is connected to one of the plurality of shape memory materials at the first end thereof, and
    a unitary flow restrictor connected to the second end of each of the plurality of the shape memory materials;
  wherein the adjustable gas flow valve adjusts gas flow rate through the cooling gas pathway based on a physical parameter of compressed gas exiting the compressor section of the turbine.

2. The cooling gas flow control device according to claim 1, wherein one of the plurality of shape memory materials comprises a shape memory alloy.

3. The cooling gas flow control device according to claim 1, wherein one of the plurality of shape memory materials comprises a channel through the shape memory material, and the channel is adapted to receive gas from the compressor section.

4. The cooling gas flow control device according to claim 1, wherein the unitary flow restrictor comprises an accordion-like structure.

5. The cooling gas flow control device according to claim 1, wherein the unitary flow restrictor comprises a valve disc positioned in a hole of a connecting wheel, where the connecting wheel is positioned between and joins the compressor section and the turbine section of the turbine.

6. The cooling gas flow control device according to claim 5, wherein the mount is positioned in a recess located adjacent an aperture in the connecting wheel.

7. The cooling gas flow control device according to claim 1, wherein one of the plurality of shape memory materials is formed in segments that change shape to reduce flow rate through the adjustable gas flow valve.

8. The cooling gas flow control device according to claim 7, wherein the one of the plurality of shape memory materials changes between a cylindrical shape to a truncated conical shape to adjust the gas flow through the adjustable gas flow valve.

9. The cooling gas flow control device according to claim 1, wherein the cooling gas pathway is located in a connecting wheel which connects a compressor section and the turbine section of a gas turbine.

10. The cooling gas flow control device according to claim 1, wherein one of the plurality of shape memory materials comprises multiple different shape memory segments, wherein each segment has a different transition temperature.

11. A method of controlling cooling gas for a rotor cavity of a turbine rotor comprising
  a. drawing cooling gas from a compressor of a turbine, said cooling gas having a temperature;

b. directing the cooling gas into an internal pathway connecting the compressor and a rotor cavity of turbine rotor, c. passing the cooling gas in the internal pathway through an adjustable gas flow valve, the adjustable gas flow valve including:

a mount, a plurality of shape memory materials each having a first end and a second end, wherein the mount is connected to one of the plurality of shape memory materials at the first end thereof, and a unitary flow restrictor connected to the second end of each of the plurality of the shape memory materials;

wherein each of the plurality of shape memory materials changes shape based on an input temperature to the plurality of shape memory materials to adjust the flow of the cooling gas through the internal pathway to the cavity of the turbine rotor.

12. The method according to claim 11, wherein the compressor has a compressed gas discharged there from, said compressed gas having a temperature, and the input temperature is the temperature of compressed gas being discharged from the compressor.

13. The method according to claim 12, wherein the adjustable gas flow valve comprises a channel through the plurality of shape memory materials, and the compressed gas is passed through the channel with the plurality of shape memory materials responding to the temperature of the compressed gas passed through the channel.

14. The method according to claim 11, wherein the input temperature is the temperature of the cooling gas being directed into the internal pathway.

15. The method according to claim 14, wherein the adjustable gas flow valve comprises a channel through the plurality of shape memory materials, and the cooling gas is passed through the channel with the plurality of shape memory materials responding to the temperature of the compressed gas passed through the channel.

* * * * *